United States Patent
Bergen et al.

(10) Patent No.: US 9,433,142 B2
(45) Date of Patent: *Sep. 6, 2016

(54) TOOL CONTROL SYSTEM FOR AGRICULTURAL SEEDERS

(75) Inventors: Gary Bergen, Vegreville (CA); Sylvio Julien Tessier, Winnipeg (CA); Tim Strydhorst, Sanford (CA); James Eichele, Winnipeg (CA); Grant Howard Adolph, Winnipeg (CA); Ryan Pinfold, Edmonton (CA); Sean Lewis, St. Albert (CA); Leo V. Turko, Vegreville (CA); Larry Beever, Vegreville (CA)

(73) Assignee: Buhler Ezee-On Inc., Vegrerille, AB (CA)

( * ) Notice: Subject to any disclaimer, the term of this patent is extended or adjusted under 35 U.S.C. 154(b) by 89 days.

This patent is subject to a terminal disclaimer.

(21) Appl. No.: 13/561,631

(22) Filed: Jul. 30, 2012

(65) Prior Publication Data

US 2013/0112124 A1    May 9, 2013

Related U.S. Application Data

(63) Continuation-in-part of application No. 13/291,843, filed on Nov. 8, 2011.

(51) Int. Cl.
*A01C 7/20* (2006.01)
*A01C 5/06* (2006.01)

(52) U.S. Cl.
CPC *A01C 7/205* (2013.01); *A01C 5/06* (2013.01)

(58) Field of Classification Search
CPC ...... A01C 5/062; A01C 5/068; A01C 5/066; A01C 5/06; A01C 5/00; A01C 7/205; A01C 7/203; A01C 7/201; A01C 7/20; A01C 7/00; A01C 7/208; A01B 15/14; A01B 15/145; A01B 15/02; A01B 15/00; A01B 23/043; A01B 23/04; A01B 25/00; A01B 33/16; A01B 35/12; A01B 35/14; A01B 35/10; A01B 35/08; A01B 35/06; A01B 35/04; A01B 35/02; A01B 35/00; A01B 35/18; A01B 35/16; A01B 33/00; A01B 33/02; A01B 33/025; A01B 49/02; A01B 49/027; A01B 49/06; A01B 49/04; A01B 51/04; A01B 59/002; A01B 59/00; A01B 59/04; A01B 61/00; A01B 61/04; A01B 61/044; A01B 61/046; A01B 63/00; A01B 63/002; A01B 63/008; A01B 63/14; A01B 63/24; A01B 63/32; A01B 79/02; A01B 79/005; A01B 79/00
USPC ........... 111/926, 62, 134, 135, 927, 136, 69, 111/79, 81, 194, 195, 191, 190, 170, 149, 111/152, 153, 156; 172/407, 395, 239, 413, 172/4, 260.5, 417, 448, 423, 424, 427, 663, 172/675; 701/50
See application file for complete search history.

(56) References Cited

U.S. PATENT DOCUMENTS 5,234,060 A * 8/1993 Carter ........................... 172/413

*Primary Examiner* — Christopher J Novosad
(74) *Attorney, Agent, or Firm* — Adrian D. Battison; Ade & Company Inc.

(57) ABSTRACT

A seeder includes a frame on ground wheels defining tool bars for seeding elements spaced across the frame. Each element includes a pair of parallel arms connected to the tool bar bracket forming a parallel linkage for up and down movement of a support arm connected at a rear end and carrying the packer wheel. A spring applies a downward spring force on the parallel linkage to apply a downward force on the packer wheel so that the spring force increases as the parallel arms pivot upwardly and decreases as the parallel arms pivot downwardly. A control device is arranged to raise and lower the tool bar in response to a detected value of a sensor so as to change the angle of the parallel linkage and change the spring force. A cam controlled double rack adjustment of the height of the opener allows the user to change seeding depth.

23 Claims, 11 Drawing Sheets

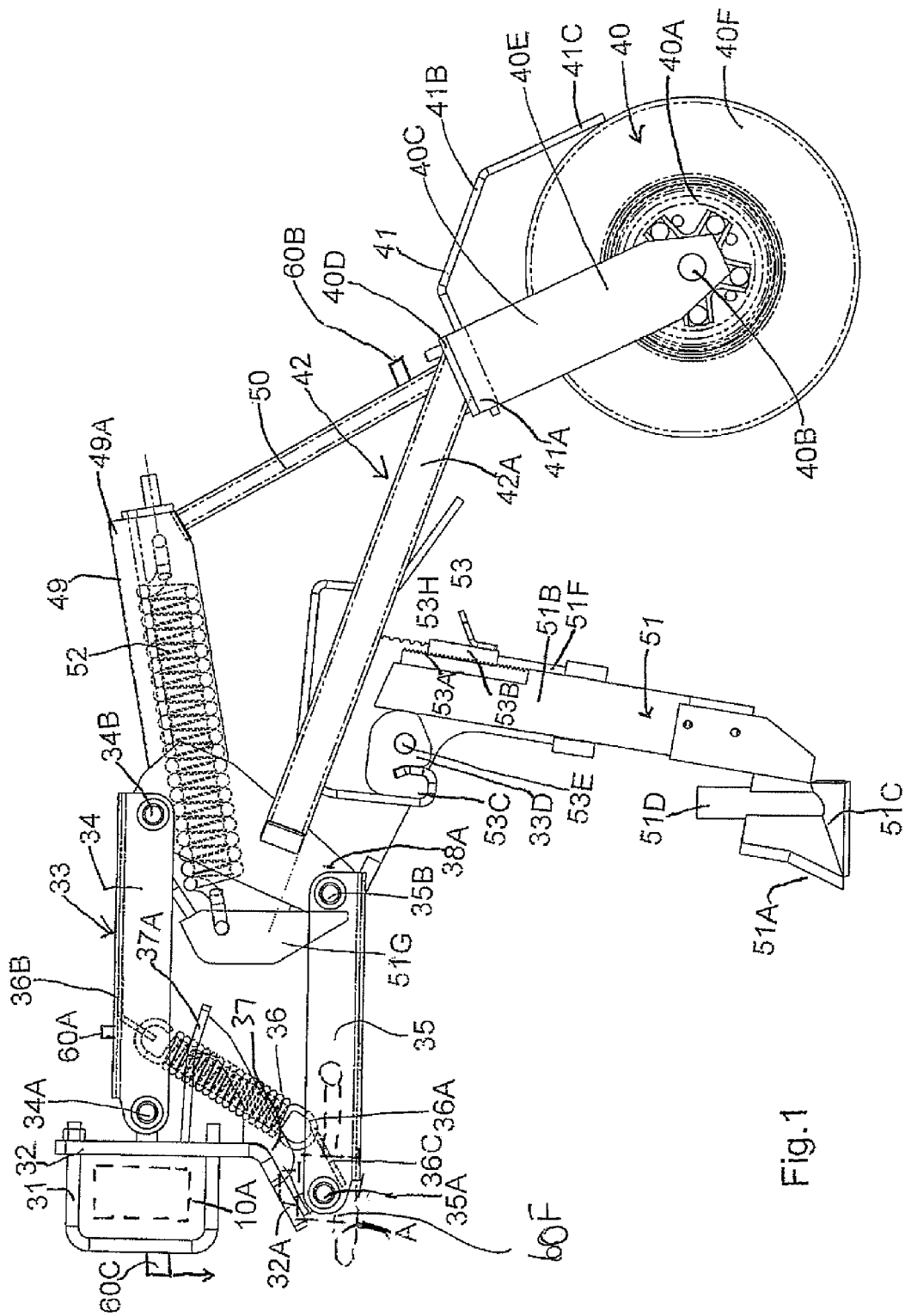

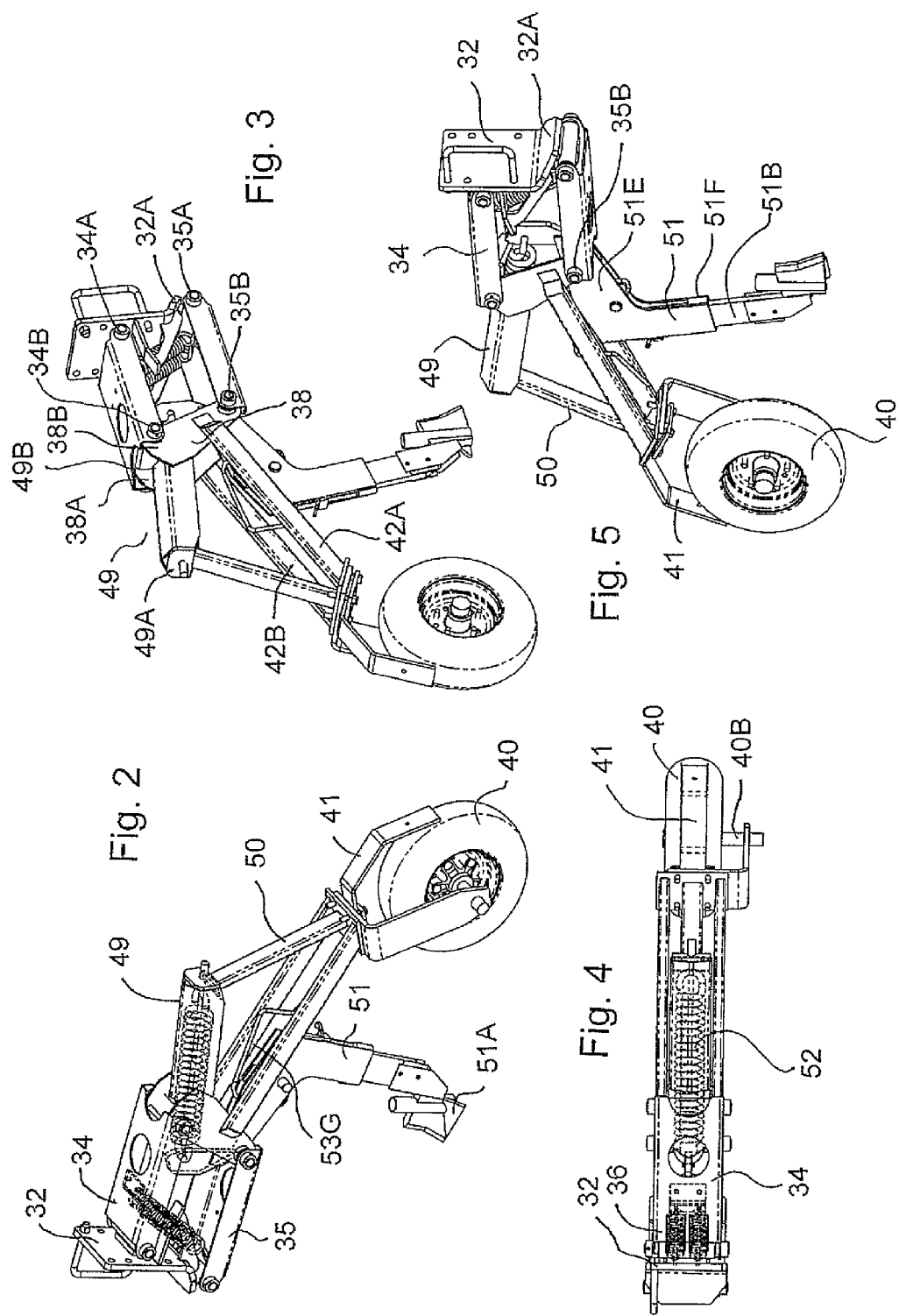

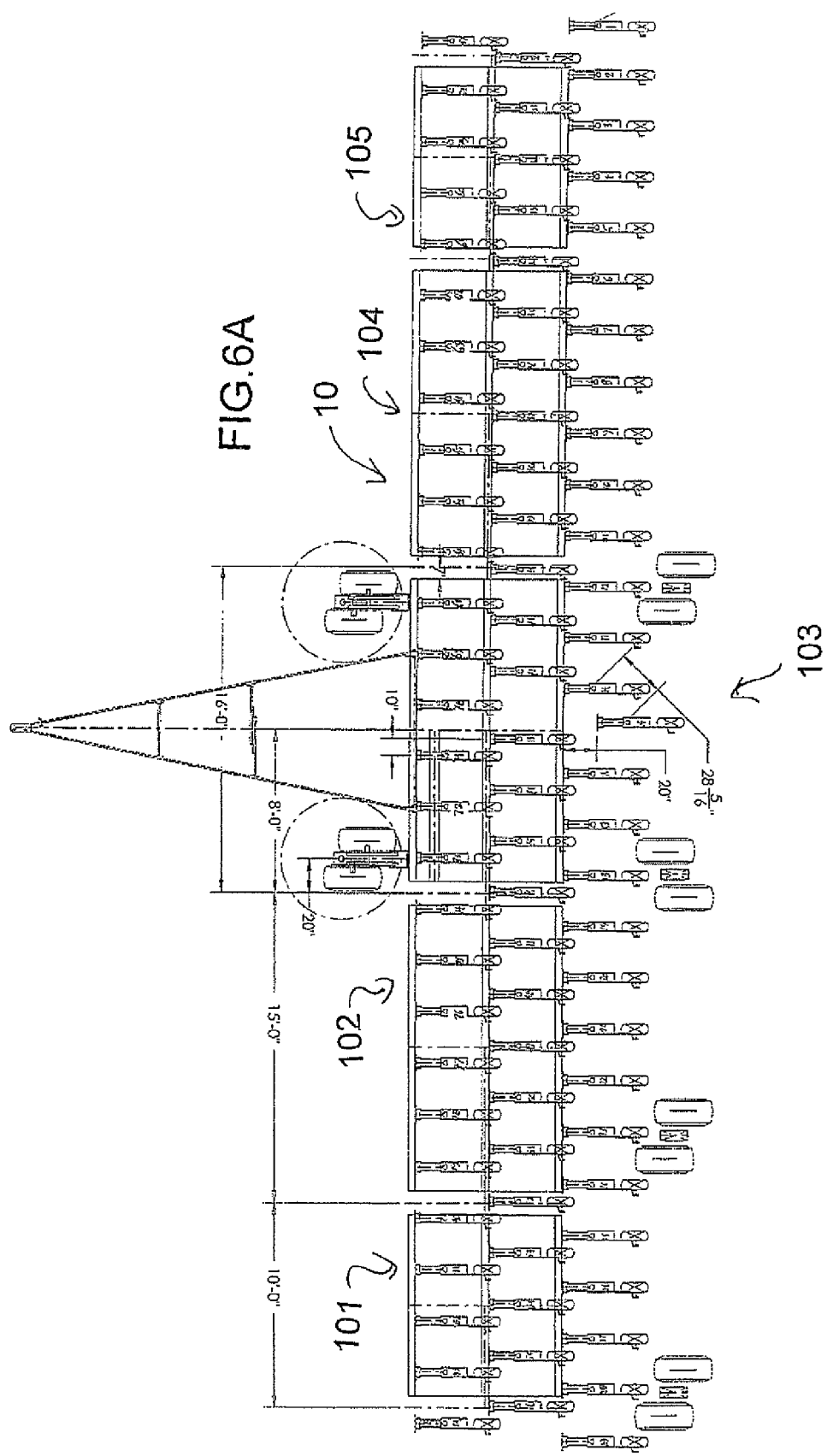

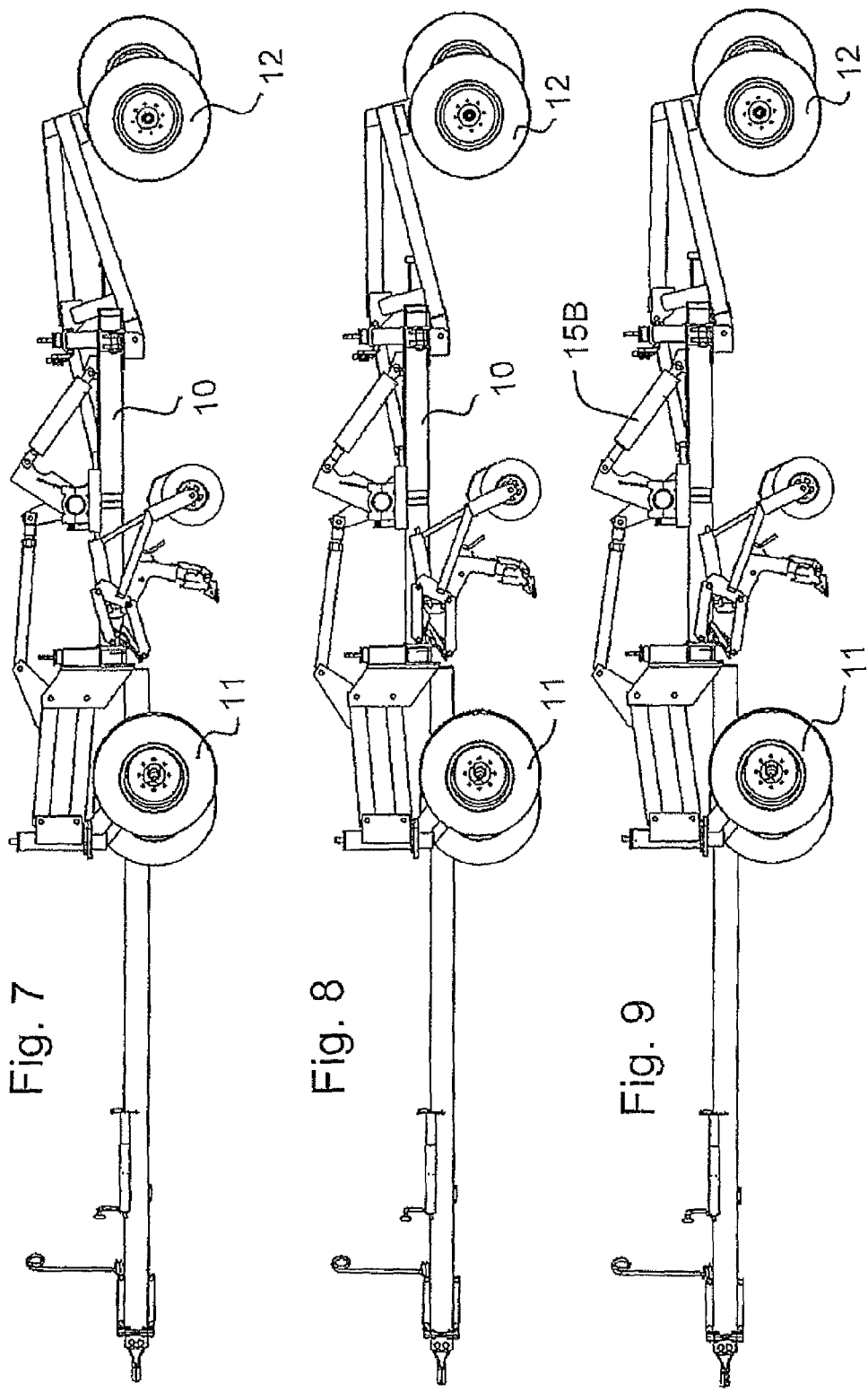

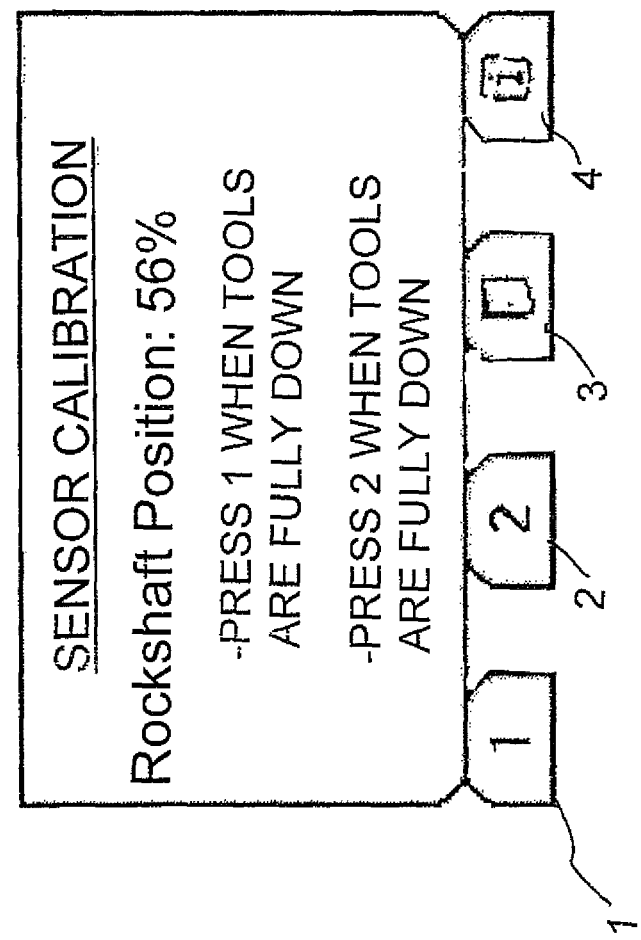

TOOL CONTROL SYSTEM FOR AGRICULTURAL SEEDERS

This application is a continuation in part of application Ser. No. 13/291,843 filed Nov. 8, 2011.

This invention relates to an agricultural seeder in which seeds are conveyed from a central hopper to a number of seeding elements carried upon a frame with the seeds being ejected into the ground through a ground opener provided on each of the seeding elements and rolled by a following packer wheel.

BACKGROUND OF THE INVENTION

Seeders of this type have generally used either a knife or a cutting sweep which is carried at each of the seeding elements by the frame so as to cut a furrow in the ground into which the seeds are deposited. The depth of seeding is of fundamental importance to the germination an subsequent emergence of plants and should therefore be very accurately controlled. The seed must be properly placed a required spacing from the soil surface and also taking into account soil surface moisture characteristics and the sub-surface moisture to obtain the optimum germination.

In many seeders the depth of seeding is controlled by mounting the seeding element in fixed position on the frame and then by controlling the height of the frame relative to the ground as accurately as possible by providing a frame which can flex at different positions so the height of the frame varies to follow as accurately as possible the contours of the ground. However this approach has of course its limitations in that the frame necessarily must have some structural stability which thus limits its ability to totally follow the contours of the ground. Thus some of the seeding elements will at various times provide a depth of seeding which is too deep and other times the depth will be too shallow.

Other commercially available seeding systems are provided in which the seeding elements are individually mounted upon the frame so that they can individually follow the contours of the ground.

SUMMARY OF THE INVENTION

It is one object of the invention to provide an improved seeder where the seeding elements include a ground opener and a packer wheel on an element which can float vertically relative to the frame.

According to a first aspect of the invention there is provided an agricultural seeder comprising:

a frame having at least one tool bar;

ground wheels for supporting the frame for transportation in a direction of working movement across ground to be seeded;

a plurality of seeding elements each including a bracket mounted on the tool bar of the frame so that the seeding elements are arranged at spaced positions across the width of the frame for applying seeds to the ground as the frame is moved across the ground;

each seeding element including a ground opener for cutting a furrow into the surface of the ground;

each seeding element including a packer wheel behind the ground opener for rolling along the ground at least partly in the furrow mounted in a set relationship to the ground opener;

each seeding element being mounted on the tool bar for up and down floating movement relative to the frame independently of the other seeding elements;

and a sensing system for providing an output signal indicative of a depth of penetration of the packer wheel of at least one of the seeding elements from a surface of the ground as the depth changes due to changes in soil conditions.

The soil conditions across a field can vary due to moisture content, previous tillage and the location in the field relative to hills and valleys in the field. Thus the soil can become very soft and easy to penetrate so that the seeding depth becomes too deep or can become very hard leading to the opener being forced higher in the soil. This change, as it occurs across the field, can be detected by sensing the height of the packer wheel and this signal used to change the downward force on the packer wheel.

Preferably there is provided a control system responsive to the signal from the sensing system arranged to keep the depth of penetration at a predetermined substantially constant value.

Preferably the sensing system is arranged to measure ground height. This can be done by a non-contact sensor for detecting ground distance from a predetermined location at the frame.

As a preferred arrangement, however, the sensing system includes a gauge wheel for rolling on the ground so as to measure ground height.

In this arrangement, the packer wheel and the gauge wheel can be mounted from the tool bar on supports having a symmetrical geometry of movement and wherein a height of the packer wheel and a height of the ground wheel are measured by symmetrical component on the supports. That is for simplicity of mechanical construction and operation, the mounting of the packer wheel and the gauge wheel are directly symmetrical or of the same mechanical elements so that they operate and move in symmetrical manner while the packer wheel runs in the furrow and the gauge wheel runs on the ground surface thus directly detecting the difference in height and hence the depth of the packer wheel in the furrow.

One simple way to measure the difference in depth is to measure an angle of a support arm of the supports carrying the packer wheel and the gauge wheel. As these are symmetrical and move symmetrically, the angle is directly proportional to the depth to be measured and the different in the angle is proportional to the depth of the packer wheel in the furrow.

Preferably there is provided an operator visual display which shows a plurality of selectable depths of the packer wheel for selection by the operator. This can be shown diagrammatically as a visual image or as a numerical value. Of course the selection of the depth of the packer wheel also controls the depth of operation of the seeding tool or hoe opener since these are tied together so that the packer wheel controls the depth of the hoe opener. The selection of the depth of packer wheel has been found also to control the coverage of soil over the seed due to the increased movement of soil as the furrow formed by the hoe opener is of increased depth. Thus the selection of the depth of operation of the packer wheel controls not only the depth of the seed from the surface but also the coverage of the seed by packed soil.

Preferably there is provided a control system responsive to the signal from the sensing system for changing the downward force applied onto the packer wheel of each seeding element. This control of the force applied in dependence on the measured depth has been found to control the depth of rolling of the packer wheel sufficiently accurately to locate the seed at the required depth and at the required soil coverage as the soil conditions change.

In the preferred arrangement, the force application system applies a common force to all of the seeder elements by a central adjustment system. However individual adjustment is possible.

Preferably the force application system is adjusted by changing the height of the tool bar from the ground where there is a spring force which is proportional to frame eight.

In many cases where the seeder is wide, the frame can include a plurality of sections each having a plurality of seeding elements and wherein each section of the frame includes a sensing system for providing an output signal indicative of a depth of penetration of the packer wheel of at least one of the seeding elements from a surface of the ground as the depth changes due to changes in soil conditions. In this case, each section can be independently adjusted so as to lift the seeding elements thereof from the ground to halt seeding of that section. This can be used where seeding in a particular area is not required.

Preferably the frame is carried on front and rear wheels, one or both of which may castor, and the height of the tool bar is controlled by operating a cylinder on the frame to rotate a rocker shaft on the frame to drive through linkages the height of the front and rear wheels relative to the frame so that the frame is maintained horizontal as it is raised and lowered. However other frame arrangements can be used.

Preferably the ground opener is carried on an arm which is pivotal relative to a support arm carrying the packer wheel for a spring trip action of the ground opener.

In a particularly preferred construction, each seeding element includes a pair of parallel arms connected to the bracket and extending rearwardly therefrom to form a parallel linkage for up and down pivotal movement relative to the tool bar to different angles of the parallel linkage relative to the ground, a spring arrangement applying a downward spring force on the parallel linkage to apply a downward force on the packer wheel, the spring arrangement being arranged such that the spring force increases as the parallel arms pivot upwardly and decreases as the parallel arms pivot downwardly, and a control device arranged to raise and lower the tool bar relative to the ground so as to change the angle of the parallel linkage relative to the ground so as to change the spring force. However other mechanical arrangements can be used to provide a force on the packer wheel which can be controlled or which is proportional to frame height.

Preferably the parallel arms carry a link connected across rear pivot pins at the rear of the arms which link is rigidly attached to a rearwardly extending support arm carrying the packer wheel.

In accordance with a second aspect of the invention there is provided an agricultural seeder comprising:

a frame having at least one tool bar;

ground wheels for supporting the frame for transportation in a direction of working movement across ground to be seeded;

a plurality of seeding elements each including a bracket mounted on the tool bar of the frame so that the seeding elements are arranged at spaced positions across the width of the frame for applying seeds to the ground as the frame is moved across the ground;

each seeding element including a ground opener for cutting a furrow into the surface of the ground;

each seeding element including a packer wheel behind the ground opener for rolling along the ground at partly within the furrow;

each seeding element being mounted on the tool bar for up and down floating movement relative to the frame independently of the other seeding elements;

each seeding element including a rearwardly extending support arm and carrying the packer wheel such that the packer wheel can move upwardly and downwardly relative to the tool bar;

wherein the frame includes a plurality of sections each having a plurality of seeding elements;

and wherein each section can be independently adjusted so as to lift the seeding elements thereof from the ground to halt seeding of the section.

In accordance with a second aspect of the invention there is provided an agricultural seeder comprising:

a frame having at least one tool bar;

ground wheels for supporting the frame for transportation in a direction of working movement across ground to be seeded;

a plurality of seeding elements each including a bracket mounted on the tool bar of the frame so that the seeding elements are arranged at spaced positions across the width of the frame for applying seeds to the ground as the frame is moved across the ground;

each seeding element including a ground opener for cutting a furrow into the surface of the ground;

each seeding element including a packer wheel behind the ground opener for rolling along the ground at least partly in the furrow;

each seeding element being mounted on the tool bar for up and down floating movement relative to the frame independently of the other seeding elements;

a gauge wheel mounted on the tool bar for running on a surface of the ground;

a first sensor for providing a first signal indicative of a height from the tool bar of the packer wheel as it runs in the furrow;

and a second sensor for providing a second signal indicative a height from the tool bar of the gauge wheel as it runs on the ground.

Preferably the packer wheel and the gauge wheel are mounted from the frame on supports having a symmetrical geometry of movement and wherein a height of the packer wheel and a height of the ground wheel are measured by symmetrical component on the supports.

Preferably the symmetrical components are arranged to measure an angle of a support arm of the support.

The opening system carried with the packer wheel can be preferably a hoe opener but other opening systems such as disks, sweeps can be used.

As is well known, one of the functions of the packer wheel is to act as a gauge wheel, that is, it is the main component for controlling the furrow opener's operating depth.

The control device to raise and lower the frame to control the packer force can be operated using a number of different sensor arrangements. Thus a number of different arrangements are possible to adjust/control the force applied on the packer wheel by the frame, that is, transferring load from the frame's wheels onto the opener assemblies. Some of these are:

a) sensing the actual force applied on the packer wheels, which can be sensed at one of the packer wheels or at a plurality of packer wheels and averaged, that is a direct approach;

b) sensing the angle of the parallel linkage or the position of the seeding element relative to the tool bar, that is an indirect sensing of the actual force applied on the packer wheel via geometric calculation to determine the force;

c) sensing the position of the frame relative to the packer wheel. It is possible to mount a position sensor on the rocker shaft assembly which controls the height of the frame relative to the ground wheels to implement this arrangement.

d) sensing the hydraulic pressure on the frame height control cylinder, although this is not preferred.

Of course the total down force is shared between the individual seeding elements and their packer wheels, but typically this force is shared equally, except for individual changes in ground height which are averaged out amongst all of the packer wheels.

Preferably the frame is carried on front and rear wheels and the height of the tool bar is controlled by operating a cylinder on the frame to rotate a rocker shaft on the frame to drive through linkages the height of the front and rear wheels relative to the frame so that the frame is maintained horizontal as it is raised and lowered. However other frame support arrangements can be used provide the height of the frame is adjustable by moving the position or orientation of the wheels relative to the frame. Preferably the system is operate symmetrically so that the whole of the frame, typically carrying three or more parallel tool bars is lifted while being maintained horizontal. Arrangements of this type can be designed by a person skilled in this art.

Preferably the ground opener is carried on an arm which is independently pivotal relative to the support arm carrying the packer wheel for a spring trip action of the ground opener to accommodate impacts with obstacles. The trip action generally does not include the packer wheel which can float over the objects by the parallel linkage moving upwardly against the spring force. The arm is preferably pivotal relative to the rear pivot pin of a bottom one of the parallel arms.

Preferably the bracket carries a bottom stop member for engaging one of the parallel arms to halt downward movement thereof.

Preferably the parallel arms carry a link of the parallel linkage system connected across rear pivot pins at the rear of the arms which link is rigidly attached to the rearwardly extending support arm carrying the packer wheel.

Preferably the link carries a support member for a rear end of a spring which is deformed by the spring trip and wherein the arm of the ground opener includes at its forward end a lever which pulls a forward end of the spring in the spring trip action.

Preferably the support member for the rear end of the spring forms a part of a brace for the support arm of the packer wheel.

In accordance with another feature, the packer wheel includes a scraper strap extending rearwardly and over the wheel so that a rear end of the strap engages a peripheral surface of the packer wheel.

In accordance with another feature, the ground opener includes a shank carried in a sleeve and extending downwardly from the sleeve for supporting a cutter at a bottom end of the shank and wherein the shank is adjustable longitudinally of the sleeve. Preferably the adjustment is provided by the shank and the sleeve each including a saw tooth rack longitudinally thereof so that the racks are interengaged at longitudinally adjustable positions therealong. There is then provided a manually operable cam which is movable to a locked position in which the racks are forced into engagement and to a released position in which the racks are free for longitudinal adjustment. Preferably the cam is operable by a spring handle which is latched into position in the locked position.

The hydraulic control system using the measurement of the packer wheel depth enables a farmer/operator to keep constant floating seeding tool where the tools are rigidly mounted to the frame via continuous monitoring of the soil surface level relative to the implement frame position, and relative to the seeding/tillage tool operating position in soil. This system is particularly useful for the operation of the seeder, where the operator can select a target furrow profile configuration (shallow furrow, normal furrow, or deep furrow profile), and achieve consistent furrow profile by maintaining a differential within an allowable range between a gauge wheel rolling on the soil and the gauge wheel/packer wheel rolling into the seed furrow.

The components usually will include three position sensors, one installed on one of the seeding elements or openers, one located on a gauge wheel, and one installed on the frame positioning rockshaft or any other actuator.

The opener is comprised from a furrow opener (any type) and a gauge wheel; the gauge wheel can serve the dual purpose of packer wheel, and run in the seed furrow. The signals from position sensors are compared to determine the difference in relative elevation between a gauge wheel and the packer wheel on an opener. When the elevation difference exceeds an acceptable range is too small or too large, vs. a set differences (e.g. ½" or 1" seeding depth), then the controller installed in the tractor's cab energizes the electric control valve located on the seeder's hitch, to move the rockshaft and thereby lower or raise the seeder frame to effect the correction. The advantage of this system is that it enables for automatic frame height/seeding tool depth correction when the seeder travels from normal field conditions to wet or soft soil, and on to hard soil situation. The system will automatically attempt to correct by applying more force or relieving force on the tools, usually by means of a spring loading system. Seeders without this technology will result in undesirable variations in seed placement, such as excessively deep seed placement in soft soils, or too shallow seeding in hard areas of the field. The present technology allows for very uniform seed coverage and seeding depth across a wide range of field conditions within fields as well as between fields, with no adjustment required on the seeder or its seeding tools.

In the some applications, the electric control valve is hooked into a "power beyond" configuration relative to the tractor's pump, to limit the tractor power consumption, as the hydraulic pump would provide oil flow to this valve only when a tool depth correction is required. However, this system does not specifically require to be configured as a power beyond application.

The third position sensor at the frame height control system can be useful to establish thresholds for very slow operation of the rockshaft in the soil or fast operation for raising the tool, but this is optional.

The operator can select/toggle between either one of shallow, normal or deep furrow profile; for that matter, the adjustment range can be made unlimited.

Ideally, but not necessarily, a pair of sensor can be installed at multiple locations across a seeder, such as at one location for each section of multi-section drills. Multiple pairs of sensors allow for averaging the differences between gauge wheel and live opener pairs, and therefore a more precise operation of the technology over the width of the seeder. Otherwise, a single pair is enough to implement the technology.

In a first variation to be used for seeders an adjustable force which is retained constant can be applied to the packer wheel. In this application, only a sensor is required on a "live" seed opener, with or without sensor at the hydraulic force to the frame, to apply and maintain a set force on the packer wheel. This may be useful to operators that prefer controlling packing force, for certain soil conditions. The force can be toggled up or down, depending on the particularities of the controller software. The force is determined by an equation describing the deformation of the spring loading self-contained seed opener assemblies that include a spring.

In a second variation to be used for seeders there is provided sectional control of the air seeder or multi-section seed drills. As most farmland is rarely regularly shaped or devoid of obstacles such as water ponds, operators commonly are left with a strip of soil narrower than their seeding implement or else have to go around obstacles. When this happens, operators will either not seed these strips or wedges of land, or else double seed over the previous pass. This is at the detriment of disturbing the seedbed, and/or loss of seeding products of seed and fertilizer.

By installing pairs of sensors on each of the sections, and providing for a control valve for each of these sections, the controller can be programmed to independently raise, either totally or partially, any given section for the operator to avoid disturbing previously seeded land. Where possible with air carts providing such features, seed and fertilizer material flow to these sections can be shut off for additional savings.

In a third variation to be used for seeders there are provided alternative sensing methods to replace the gauge wheel. Whereas the technology was developed through the use of commonly available position sensors, the sensor provided by the gauge wheel can be easily substituted for a non-contact sensor such as ground radar or ultrasonic sensor, or else the gauge wheel could be any other kind of device or sensor providing a monitoring signal correlated to the ground location relative to the live opener or the seeder frame height.

In a fourth variation to be used for seeders, use can be made of the tractor's electric hydraulic valves. Typically the technology presented above includes the use of an externally mounted electric control valve generally carried on the seeder. However this valve can be eliminated in tractors equipped with electrical control valves in their implement valve banks or any other available valve provided as an option, add on, or standard equipment. In this application, the controller enables the technology by simply controlling one of the standard electric control valves of the tractor, as a reduced cost application of the technology.

In a fifth variation to be used for seeders control system to maintain constant down-force on packer wheel, farmers sometimes prefer to control the down-force on the packer wheel as means to provide a desired furrow characteristic. This can be easily implemented with the present system, as signal from sensor on the packer can be used to calculate the force developed by the springs, as a result of frame position, and translate this force into down-force applied on the packer wheel. The operator can thereby select/dial in the desired down-force, and the system would keep it constant across the field or between fields.

When used for tillage implement depth control, the components for the technology, such as the use of the gauge wheel and associated sensor, or any other type of surface monitoring system, can be used to control the implement frame height or tillage tool operation depth, using the other components developed for seeders.

The arrangement described herein can provide one or more of the following features and advantages:

1. Seeding depth is maintained independently from adjusting the position of the drill frame, when in general operating position for engaging tool in the soil, as a result of the independent motion of the parallel linkage;

2. The parallel linkage allows to maintain the vertical relationship between the hoe opener point and the packer wheel elevation 3. The spring loaded linkage is designed to apply a known down force on the packer wheel via an adjustment of the drill frame elevation from the ground surface so that the control system can be operated to "dial-in" a set packer down force;

4. The design allows for a desirable range of packing down force from less than 100 lbs to over 300 lbs;

5. The operation depth or seeding depth for the opener is adjusted without any tools, via a double rack assembly held in place by a spring loaded cam system;

6. The actual seeding depth is solely achieved by adjusting the vertical position of the opener relative to the packer wheel's elevation;

7. The packer wheel elevation is not adjusted;

8. The assembly comprises only a single furrow opener;

9. The furrow opener is allowed to trip independently from the overall assembly via its own heavy spring loading, if required as a result of striking a stone or other obstacle with a trip force which can be adjustable;

10. The use of this parallel linkage is not limited to using a hoe opener; other soil engaging tools could be used instead 11. The assembly includes an infinitely adjustable scraper for the packer wheel.

12. It can provide adjustable packing force which is delivered through springs at the seeding element and regionally by hydraulic pressure set at the cab which controls the pressure supplied to the hydraulic cylinders controlling the height of the frame.

13. The basic setting for each shank is set at the factory which means re-setting is not always necessary at the frame and individual hydraulic rams are not necessary and are not used at the seeding elements.

14. The seeding depth is set in small increments using a simple manual setting arrangement. This makes it sufficiently easy for depth adjustment to be made that it overcomes the general reluctance to change for different crops or different soil conditions.

BRIEF DESCRIPTION OF THE DRAWINGS

One embodiment of the invention will now be described in conjunction with the accompanying drawings in which:

FIG. 1 is a side elevational view of one seeding element of a seeder according to the present invention.

FIG. 2 is an isometric view from the rear and one side of the seeding element of FIG. 1.

FIG. 3 is an isometric view from the rear and the other side of the seeding element of FIG. 1.

FIG. 4 is a top plan view of the seeding element of FIG. 1.

FIG. 5 is an isometric view from the front and one side of the seeding element of FIG. 1.

FIG. 6A is a top plan view of the seeder of FIG. 1.

FIGS. 7, 8 and 9 are a side elevational view of the seeder of FIG. 6 including the seeding element of FIG. 1.

FIGS. 11A to 11H show a series of screens on the front elevational view of the touch screen display and input of FIG. 6 showing the selection of various parameters including the furrow profiles.

In the drawings like characters of reference indicate corresponding parts in the different figures.

DETAILED DESCRIPTION

Figure 6:
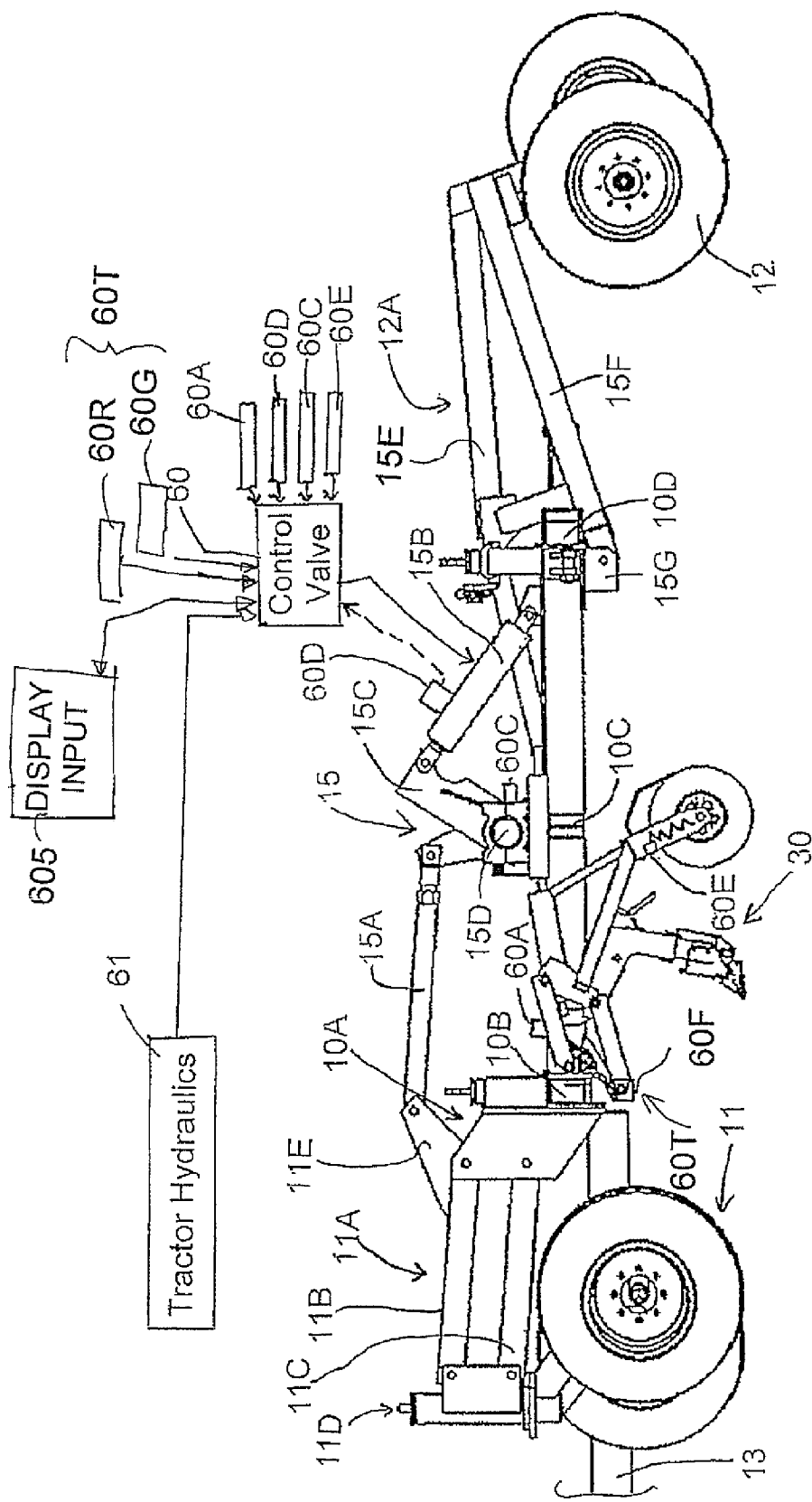
FIG. 6 is a side elevational view of a seeder according to the present invention including the seeding element of FIG. 1.

Turning firstly to FIG. 6 the whole of the seeding apparatus is shown in side elevation and comprises a main central frame 10 mounted for movement across ground to be seeded on a front wheel assembly including a pair of ground wheels 11 and a rear pair of spaced ground wheels 12.

One or both front and rear wheels may form dual castor wheels. The frame includes a series of side by side sections (not shown) which can fold in conventional manner and each is individually supported by ground wheels (not shown) which operate simultaneously with the wheels 11 and 12.

The frame is generally rectangular and formed from longitudinal and transverse beams in conventional manner. A forward part of the frame includes a hitch 13 for coupling to a towing vehicle. The front wheels 11 are carried on a support 11A from a forward end of the frame 10. The rear wheels 12 are carried on a support 12A from a rear end of the frame 10.

The details of the frame structure are not described as these will be apparent to one skilled in the art and do not form an important part of this invention.

The ground wheels 11 and 12 are mounted on the supports 11A and 12A so that they can be raised and lowered in height relative to the frame 10. Thus the support 11A includes a pair of parallel links 11B, 11C connected at a rear end to a forward end 10A of the frame and extending forwardly therefrom to a support 11D of the wheels 11. A lever 11E acts to pivot the parallel links 11B, 11C about the rear pivot so as to raise and lower the wheels 11 relative to the frame 10. The lever 11E is drive in pivotal movement by a link 15A of a drive system 15 operated by a cylinder 15B and a lever 15C connected to a rock shaft 15D on the frame.

The rock shaft 15D also drives a link 15E which pushes down on a lever 15F which carries the rear wheels 12 and is pivotally connected to the frame 10 by a bracket 15G.

In FIG. 6, one of the seeding elements is illustrated and indicated at 30. These seeding elements trail behind a transverse tool bar 31 of the frame 10 and arranged alternately on forward and rearward tool bars 10B, 10C, 10D in conventional manner so as to provide a seeding action across the full width of the frame while allowing sufficient space in between the individual seeding elements on each of the transverse tool bars. The remaining seeding elements are omitted from the frame structure in FIG. 6 for convenience of illustration.

The seeds and, if required, fertilizer are carried through air ducts (not shown) for distribution and splitting action by an air stream generated by a fan (not shown) carried on the frame at a suitable location.

The rock shaft acts to simultaneously drive all of the ground wheels to lift or lower in unison so that the frame 10 remains horizontal as it is lifted and lowered relative to the ground. Thus all of the tool bars 10B, 10C, 10D are supported at a common distance from the ground which is changed by operation of the rock shaft 15D.

One of the seeding elements 30 is illustrated in detail in FIGS. 1 through 5. The remaining seeding elements are identical to the one illustrated.

On a rear vertical face of the tool bar 10A is mounted a vertical plate 32 which si clamped to the tool bar 10A by conventional loops 31. The vertical plate includes a bottom portion 32A inclined forwardly and downwardly from the bottom of the vertical plate to a position underneath the tool bar 10A.

The seeding element further includes a parallel linkage 33 defined by upper and lower parallel arms 34 and 35. Each of the arms is formed by a channel member with side walls which provide supports for transverse pivot pins 34A and 35A at the front and 34B and 35B at the rear. The front pin 34A of the upper arm 34 is pivotally mounted on the vertical plate 32 and the front pin 35A of the lower arm 34 is pivotally mounted on the inclined plate portion 32A.

Across the rear pivot pins 34B and 35B is connected a rear link 38 which also is channel shaped and includes side walls 38A and 38B connected to the pivot pins. Thus the link and the parallel arms form a parallel linkage which controls movement of the link 38 so that it moves vertically as the arms 34 and 35 pivot about their respective pins 34A and 35A.

A stop member 37 is connected to the inclined portion 32A and extends upwardly and rearwardly therefrom to form an upper support surface 37A which butts the bottom of the arm 34 in a lower most position thereof allowed by the structure.

A spring arrangement 36 which in this embodiment is defined by two side by side springs is connected at its upper end to a bracket 36B connected to the underside of the arm 34 and at its lower end 36A to a plate 36C adjacent to and fixed to the stop member 37 so that the tension springs 36 act to apply a downward force on the parallel linkage tending to pull the link 38 downwardly. The amount of string force applied is proportional to the amount of extension of the spring so that it is proportional to the angle of the upper arm 34 around the pivot pin 34A. Thus the spring force increases as the parallel arms pivot upwardly and decreases as the parallel arms pivot downwardly.

A packer wheel 40 includes a hub 40A carried on a spindle 40B supported by a support 40C including a top plate 40D and either one or two depending legs 40E each on a respective side of a pneumatic tire 40F.

A scraper strap 41 includes a top plate 41A attached to the plate 40D and includes a scraper portion 41B extending rearwardly and over the wheel tire 40F so that a rear end 41C of the strap engages a peripheral surface of the packer wheel tire 40F at a position just above the spindle 40*b* at the rear so that as the tire moves upwardly and rearwardly, any mud collecting on the tire periphery is scraped away and does not reach the base 40D of the support 40C to cause collection.

The base 40D is connected to a pair of parallel support tubes 42A and 42B of a support arm 42 which extend upwardly and forwardly to the side walls 38A and 38B respectively of the link 38 so that the support arm 42 is rigidly connected to the link and moves with it by a welded connection between the tubes and the side walls of the link.

A trip spring support tube 49 extends rearwardly from a front end 49B welded between the sides 38A and 38B of the link 38 to a rear end 42A of the support tube which is braced to the plate 40D by a tubular brace 50. This forms a triangular braced system which holds the packer wheel at a rigid fixed position relative to the link 38 so that the packer wheel can only float upwards and downwards with the parallel linkage 33.

An opener 51 includes a ground opening element 51A connected to a shank 51B. The ground opening element can be of many different types such as points which knock on to or engage on to the shank or other types such as disk openers. A point 51C is shown and as is well known includes seed and/or fertilizer guide tube systems 51D of a conventional construction.

The shank 51B is connected at its upper end to an element 51F formed as a sleeve which connects at its upper end to a forwardly extending portion 51E located between the side walls 38A and 38B of the link 38. The forward end 51E mounts on the pin 35D for pivotal movement of the element 51F and shank 51D relative to the link 38 in a tripping action. The forward end 51E carries a lever 51G extending upwardly from the pin 35B to an upper end which is attached to a forward end of a trip spring 52 located within the tube 49. Upward and rearward tripping action of the opener 51 by pivotal movement about the pin 35B does not change the position of the link 38 or the packer wheel but allows the point to move away from an obstacle while tensioning the spring 52 by pulling forwardly on its front end relative to its rear end which is anchored at the end 49A of the tube 49.

Thus the plurality of seeding elements 30 each include a bracket 32 mounted on the tool bar 10A of the frame so that the seeding elements 30 are arranged at spaced positions across the width of the frame for applying seeds to the ground as the frame is moved across the ground.

Each seeding element including the ground opener 51A for cutting a furrow into the surface of the ground and a packer wheel 40 behind the ground opener 51A for rolling along the ground at or adjacent to the furrow so formed in a packing action.

Each seeding element 30 is mounted on the tool bar for up and down floating movement relative to the frame independently of the other seeding elements.

Each seeding element includes the pair of parallel arms 34, 35 connected to the bracket 32 and extending rearwardly therefrom to form a parallel linkage 33 for up and down pivotal movement relative to the tool bar to different angles of the parallel linkage 33 relative to the ground.

Each seeding element includes a rearwardly extending support arm 42 connected at the link 38 at the rear end of the parallel arms 34, 35 and carrying the packer wheel 40 such that the packer wheel can move upwardly and downwardly relative to the tool bar.

The shank 51B is carried in the sleeve 51F and extends downwardly from the sleeve 51F for supporting the cutter or point 51A at a bottom end of the shank. The shank 51B is adjustable longitudinally of the sleeve 51F by an adjustment arrangement 53 which is of a construction which can be quickly and manually operated. Thus the rectangular sleeve 51F and the rectangular shank 51B slidable therein each include attached thereto a saw tooth rack 53A and 53B respectively extending longitudinally thereof. The racks are interengaged at longitudinally adjustable positions therealong so that the teeth of the racks hold the elements at fixed positions defining a fixed position for the point relative to the pin 35B. A manually operable cam 53C engages the shank 51B on the side opposite the rack 53A so as to press the rack 53A on to the rack 53B. The cam 53C is thus rotatable about a pin 53E so as to be movable to a locked position of a nose 53D as shown in which the racks are forced into engagement. The cam can be released by a spring handle 53G to a released position where the nose is moved away from the shank in which the racks are free for longitudinal adjustment. The spring handle is a wire which can be lifted from a latch 53H in the locked position and rotated to the release position of the nose.

As shown in FIG. 6, a control device in the form of an actuating valve 60 is arranged to raise and lower the tool bar relative to the ground by operating hydraulic pressure to the cylinder 15B from the tractor hydraulics 61. This acts so as to change height of the tool bar relative to the ground and hence the angle A of the parallel linkage relative to the ground so as to change the spring force generated by the spring 36.

In the top plan view of FIG. 6A it is noted that the frame 10 of the seeder includes a plurality of sections 101 to 105 each having a plurality of seeding elements and connected with a main central section 103 attached to the hitch with wing sections 101 and 102 on one side and 104 and 105 on the other side.

In FIG. 6 alternative arrangements are shown.

In one arrangement, the control device 60 is operated in response to a signal from a sensor 60A at the seeding element.

The sensor 60A for example as shown in FIG. 1 can be responsive to the angle of the parallel linkage relative to the tool bar.

In another arrangement, the control device is operated in response to a signal from a sensor 60C responsive to a height of the ground relative to the tool bar detected for example at the rocker shaft 15D.

In another arrangement, the height of the tool bar is controlled by the a sensor 60D responsive to pressure at the hydraulic cylinder 15B.

In another arrangement, the height of the tool bar is controlled by a sensor 60E sensing the actual force applied by the ground on at least one of the packer wheels.

Also in FIG. 6 is shown a sensing system generally indicated at 60T for providing an output signal indicative of a depth of penetration of the packer wheel of one of the seeding elements from a surface of the ground as the depth changes due to changes in soil conditions.

Figure 10:
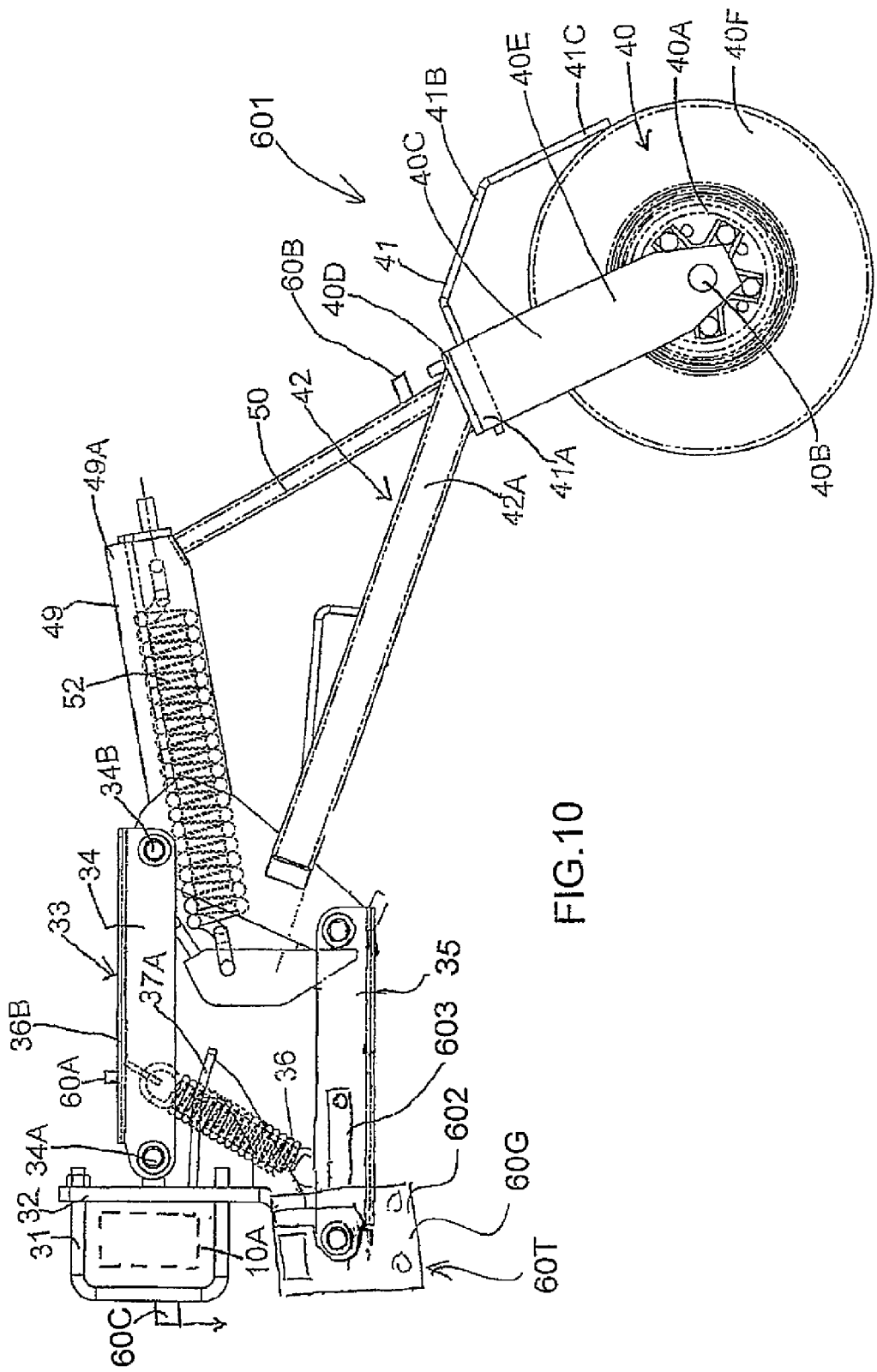
FIG. 10 is a side elevational view similar to that of FIG. 1 showing the mounting of the gauge wheel.

The sensing system 60T includes a gauge wheel 601 shown in FIG. 10 and including a mounting arrangement as described above in respect of the packer wheel 40. The gauge wheel is arranged to run in the ground between two furrows or in advance of the furrow formation so as to determine ground height. Thus there is no hoe 50 carried on the mounting for the gauge wheel.

The packer wheel 40 and the gauge wheel are mounted from the tool bar on supports as described above having a symmetrical geometry of movement. A height of the packer wheel and a height of the ground wheel are measured by symmetrical components on the supports. Thus each of the mountings includes an angle measuring transducer 60F, 60G mounted at the pin 35A of the mounting. Such transducers 60F, 60G are well known and commercially available and include a first component 602 mounted on the bracket 32 and a second component 603 fastened to the arm 35 for pivotal movement therewith about the pin 35A. Such arrangements can be implemented around either pin 35B, 34A or 34B.

The control system 60 is responsive to the signals from the sensing transducers 60F and 60G of the sensing system 60T and is arranged to keep the depth of penetration at a predetermined substantially constant value. As the packer wheel and the gauge wheel are mounted from the tool bar on supports having a symmetrical geometry of movement and a height of the packer wheel and a height of the ground wheel are measured by symmetrical component on the supports, the depth of penetration of the packer wheel in the ground is proportional to the difference between the signals from the transducers 60F and 60G. The controller 60 then uses this signal to change the height of the frame to increase or decrease the force on the packer wheel to increase or decrease the depth of penetration of the seeding opener and the depth of the furrow.

As shown in FIG. 11 there is provided a touch screen display/input screen 605 which shows to the operator a visual display 606 which provides a plurality of selectable depths 607, 608, 609 for selection by the operator. In this way the operator can visualize the depth required and make a selection which is then maintained by the depth measuring system and the control unit.

Figure 11A:
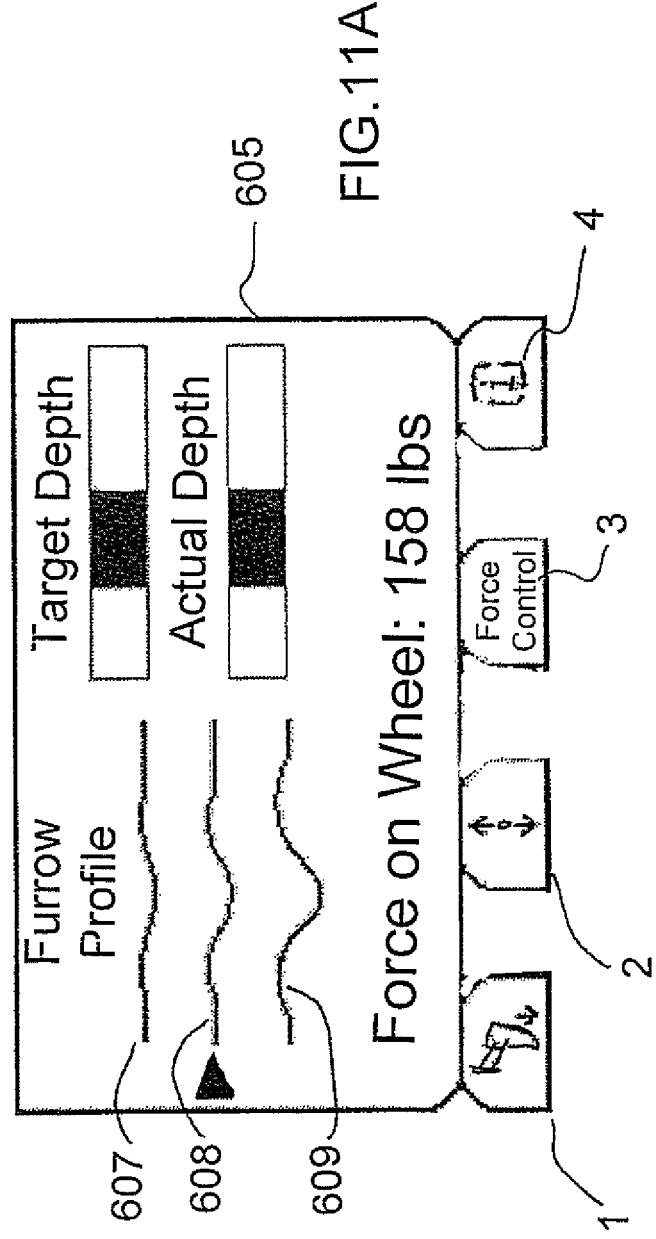

FIG. 11A shows the depth control page and operates as follows:

Press the button 1 to lower openers into the ground. When the openers are in the ground this symbol will change to show this, which when pressed will raise the openers out of the ground.

Press the button 2 to change the furrow profile.

Press the "Force Control" button 3 to change to the Force Control Page.

Press the button 4 to change to the Setup—Calibration Page.

Figure 11B:
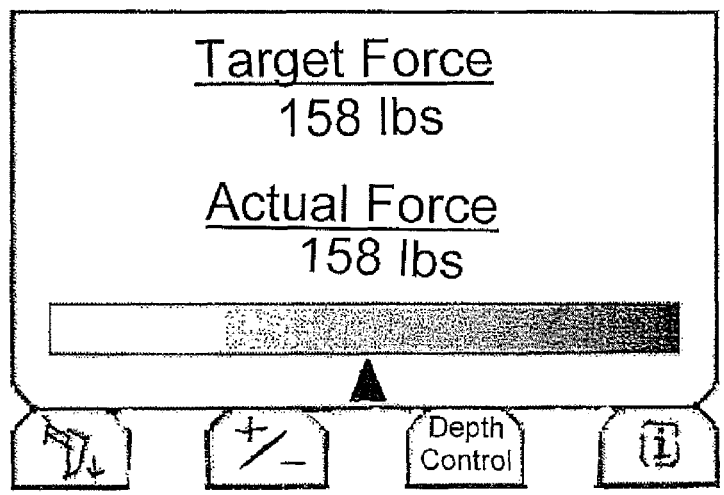
Figure 11C:
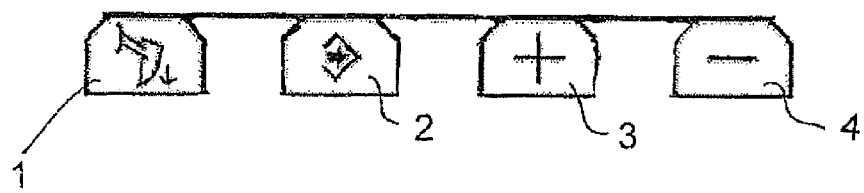

FIGS. 11B and 11C show the Force control page and operate as follows:

Press the button 1 to lower openers into the ground. When the openers are in the ground this symbol will change, which when pressed will raise the openers out of the ground.

Press the button 2 to adjust the Target Force. Doing this will change the button layout to that shown in FIG. 11C.

Press the + or − buttons 3, 4 to adjust the Target Force, and press the button 2 to accept the changes and return to the normal button layout.

Press the "Depth Control" button 1 to change to the Depth Control Page of FIG. 11A.

Press the button 4 to change to the Setup—Calibration Page.

FIG. 11D shows the Set-up and Calibration page and operates as follows:

Press the button 1 to calibrate the rockshaft in the up position. This will also calibrate the live opener and gauge wheel sensor at the same time.

Press the button 2 to calibrate the rockshaft in the down position.

Once calibrated, the Rockshaft Position value should read between 0% (fully up) and 100% (fully down).

Press the button 3 to return to either the Depth Control Page FIG. 11A or the Force Control Page FIG. 11B; whichever one was active last.

Figure 11E:
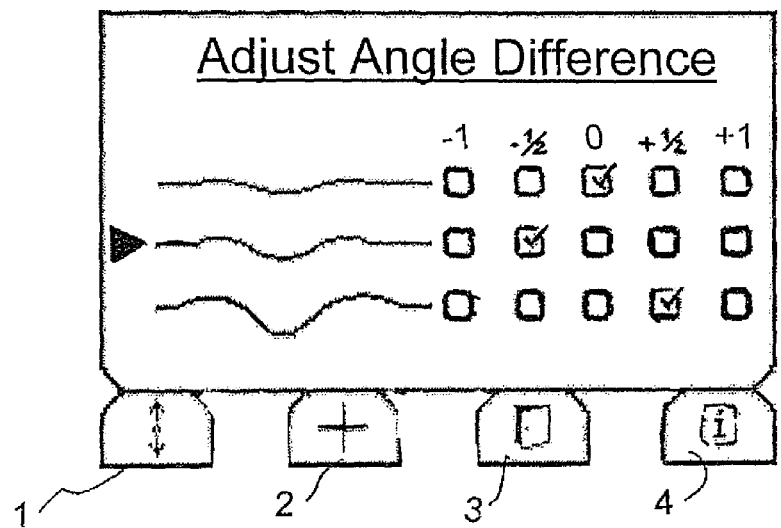

Press the button 4 to change to the Setup—Angle Adjust Page FIG. 11E.

FIG. 11E shows the Angle control page and operates as follows:

Press the button 1 to change which furrow profile you would like to adjust.

Press the button 2 to adjust the angle difference for that profile.

Press the button 3 to return to either the Depth Control Page FIG. 11A or the Force Control Pate FIG. 11B; whichever one was active last.

Figure 11F:
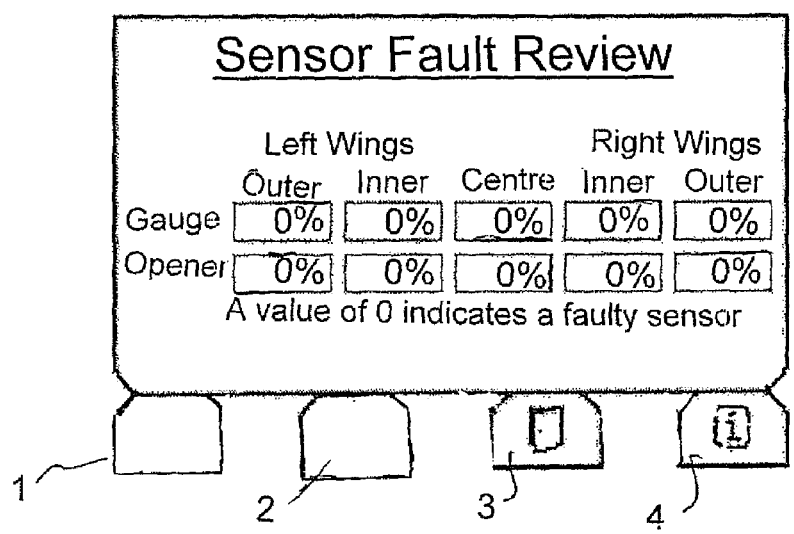

Press the button 4 to change to the Setup—Sensor Fault Page FIG. 11F.

FIG. 11F shows the Set-up Sensor Fault page and operates as follows:

Press the button 3 to return to either the Depth Control Page FIG. 11A or the Force Control Pate FIG. 11B.

Figure 11G:
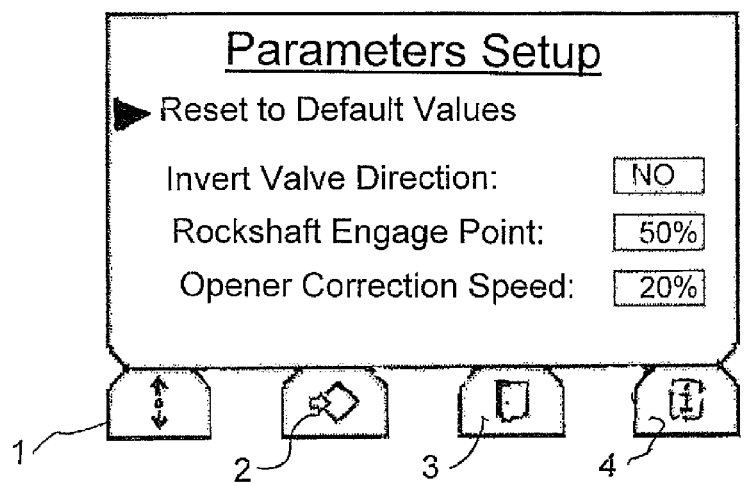

Press the button 4 to change to the Setup—Parameters Page FIG. 11G.

FIG. 11G shows the Set-up Parameters page and operates as follows:

Press the button 1 to change which parameter you want to adjust.

Press the button 2 to adjust the select parameter. The screen and button layout will then change to the parameter Set-Up Page of FIG. 11H.

Figure 11H:
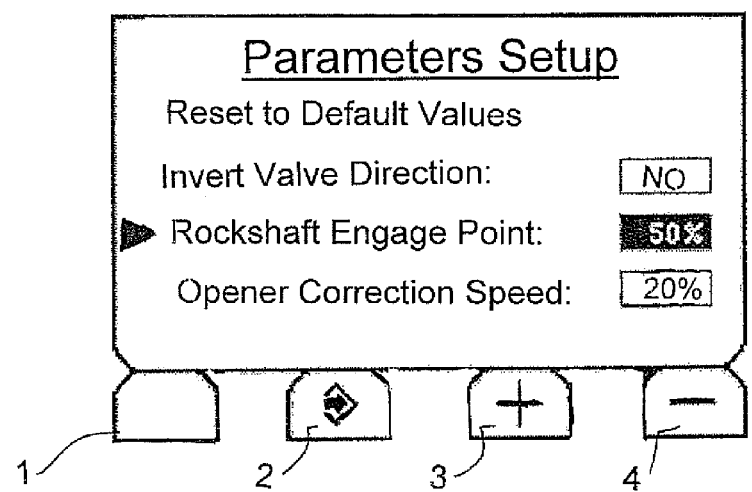

FIG. 11H shows the Parameters set-up page and operates as follows:

Press the buttons 3 or 4 to adjust the selected parameter, and press the button 2 to accept the changes and return to the normal screen & button layout. Reset to Default Valves will reset all of the parameter values, not just the ones shown on this page. This should be done as a step in the initial start-up, along with calibrating the rockshaft sensors.

Press the button 1 to return to either the Depth Control Page FIG. 11A or the Force Control Page FIG. 11B; whichever one was active last.

Press the button 4 to change to the Setup—Calibration Page.

As shown in FIG. 6A, each section of the frame includes a sensing system 60T for providing an output signal indicative of a depth of penetration of the packer wheel of at least one of the seeding elements of the section from a surface of the ground as the depth changes due to changes in soil conditions. Most commonly, the signal for sensing element 60T on each section is arranged to adjust all sections of the frame at once. Alternatively, control unit 60 can be configured so that each section can be independently adjusted by the control unit 60 operating the ground wheels of that section so as to lift the seeding elements of that section from the ground to halt seeding of the section.

The invention claimed is:

1. An agricultural seeder comprising:
a frame having at least one tool bar;
ground wheels for supporting the frame for transportation in a direction of working movement across ground to be seeded;
a plurality of seeding elements each including a bracket mounted on the tool bar of the frame so that the seeding elements are arranged at spaced positions across the width of the frame for applying seeds to the ground as the frame is moved across the ground;
each seeding element including a ground opener for cutting a furrow into the surface of the ground;
each seeding element including a packer wheel behind the ground opener for rolling along the ground at least partly in the furrow mounted in a set relationship to the ground opener;
each seeding element being mounted on the tool bar for up and down floating movement relative to the frame independently of the other seeding elements;
and a sensing system for providing an output signal indicative of a depth of penetration of the packer wheel of at least one of the seeding elements from a surface of the ground as the depth of penetration changes due to changes in soil conditions.

2. The seeder according to claim 1 including a control system responsive to the signal from the sensing system arranged to keep the depth of penetration of the packer wheel from the ground surface at a selected substantially constant value.

3. The seeder according to claim 2 wherein there is provided an input device operable by an operator of the seeder for changing the selected substantially constant depth of penetration of the packer wheel from the ground surface.

4. The seeder according to claim 3 including a visual display for the operator which provides a plurality of selectable depths of penetration of the packer wheel from the ground surface for selection by the operator.

5. The seeder according to claim 1 wherein the sensing system is arranged to measure ground height from a predetermined location.

6. The seeder according to claim 5 wherein the sensing system comprises a non-contact sensor for measuring said ground height from said predetermined location.

7. The seeder according to claim 1 wherein the sensing system includes a gauge wheel.

8. The seeder according to claim 7 wherein the packer wheel and the gauge wheel are mounted from the tool bar on supports having a symmetrical geometry of movement and wherein a height of the packer wheel and a height of the ground wheel are measured by symmetrical component on the supports.

9. The seeder according to claim 8 wherein the symmetrical components are arranged to measure an angle of a support arm of the support.

10. The seeder according to claim 1 wherein there is provided a force application system for applying a downward force onto the packer wheel of each seeding element and a control system responsive to the signal from the sensing system for changing the downward force.

11. The seeder according to claim 10 wherein the force application system applies a common force to all of the seeder elements by a central adjustment system.

12. The seeder according to claim 10 wherein the force application system is adjusted by changing the height of the tool bar from the ground.

13. The seeder according to claim 1 wherein the frame includes a plurality of sections each having a plurality of seeding elements and wherein each section of the frame includes a sensing system for providing an output signal indicative of a depth of penetration of the packer wheel of at least one of the seeding elements from a surface of the ground as the depth changes due to changes in soil conditions.

14. The seeder according to claim 13 wherein each section can be independently adjusted so as to lift the seeding elements thereof from the ground to halt seeding of the section.

15. The seeder according to claim 1 wherein the frame is carried on front and rear wheels and wherein the height of the tool bar is controlled by operating a cylinder on the frame to rotate a rocker shaft on the frame to drive through linkages the height of the front and rear wheels relative to the frame so that the frame is maintained horizontal as it is raised and lowered.

16. The seeder according to claim 1 wherein the ground opener is a hoe opener which is mounted at a predetermined position relative to the packer wheel so that its depth is controlled by the packer wheel.

17. The seeder according to claim 1 wherein the ground opener is carried on an arm which is pivotal relative to a support arm carrying the packer wheel for a spring trip action of the ground opener.

18. The seeder according to claim 1 wherein each seeding element includes a pair of parallel arms connected to the bracket and extending rearwardly therefrom to form a parallel linkage for up and down pivotal movement relative to the tool bar to different angles of the parallel linkage relative to the ground, a spring arrangement applying a downward spring force on the parallel linkage to apply a downward force on the packer wheel, the spring arrangement being arranged such that the spring force increases as the parallel arms pivot upwardly and decreases as the parallel arms pivot downwardly, and a control device arranged to raise and lower the tool bar relative to the ground so as to change the angle of the parallel linkage relative to the ground so as to change the spring force.

19. The seeder according to claim 18 wherein the parallel arms carry a link connected across rear pivot pins at the rear of the arms which link is rigidly attached to a rearwardly extending support arm carrying the packer wheel.

20. An agricultural seeder comprising:
a frame having at least one tool bar;
ground wheels for supporting the frame for transportation in a direction of working movement across ground to be seeded;
a plurality of seeding elements each including a bracket mounted on the tool bar of the frame so that the seeding elements are arranged at spaced positions across the width of the frame for applying seeds to the ground as the frame is moved across the ground;
each seeding element including a ground opener for cutting a furrow into the surface of the ground;
each seeding element including a packer wheel behind the ground opener for rolling along the ground at least partly in the furrow mounted in a set relationship to the ground opener;
each seeding element being mounted on the tool bar for up and down floating movement relative to the frame independently of the other seeding elements;
a gauge wheel mounted on the tool bar for running on a surface of the ground;
a first sensor for providing a first signal indicative of a height from the tool bar of the packer wheel as it runs in the furrow;
and a second sensor for providing a second signal indicative a height from the tool bar of the gauge wheel as it runs on the ground.

21. The seeder according to claim 20 wherein the packer wheel and the gauge wheel are mounted from the frame on supports having a symmetrical geometry of movement and wherein said height of the packer wheel from the tool bar and a height of the ground wheel are measured by symmetrical component on the supports.

22. The seeder according to claim 21 wherein the supports having symmetrical geometry are arranged to measure an angle of a support arm of the support.

23. An agricultural seeder comprising:
a frame having at least one tool bar;
ground wheels for supporting the frame for transportation in a direction of working movement across ground to be seeded;
a plurality of seeding elements each including a bracket mounted on the tool bar of the frame so that the seeding elements are arranged at spaced positions across the width of the frame for applying seeds to the ground as the frame is moved across the ground;
each seeding element including a ground opener for cutting a furrow into the surface of the ground;
each seeding element including a packer wheel behind the ground opener for rolling along the ground at least partly in the furrow mounted in a set relationship to the ground opener;
each seeding element being mounted on the tool bar for up and down floating movement relative to the frame independently of the other seeding elements;

a visual display for an operator of the seeder which provides a plurality of selectable depths of penetration of the packer wheel from the ground surface for selection by the operator;

an input device operable by the operator of the seeder for changing the selected substantially constant depth of penetration of the packer wheel from the ground surface;

a control system arranged to keep the depth of penetration of the packer wheel from the ground surface at said selected substantially constant value.

* * * * *